(12) United States Patent
Knebel et al.

(10) Patent No.: US 7,477,449 B2
(45) Date of Patent: Jan. 13, 2009

(54) SCANNING MICROSCOPE

(75) Inventors: Werner Knebel, Kronau (DE); Rafael Storz, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 1094 days.

(21) Appl. No.: 10/713,887

(22) Filed: Nov. 14, 2003

(65) Prior Publication Data

US 2004/0095624 A1 May 20, 2004

(30) Foreign Application Priority Data

Nov. 15, 2002 (DE) .................... 102 53 609

(51) Int. Cl.
*G02B 21/06* (2006.01)
(52) U.S. Cl. ................... 359/385; 359/368
(58) Field of Classification Search ........... 359/368, 359/385, 388
See application file for complete search history.

(56) References Cited

U.S. PATENT DOCUMENTS 5,065,008 A * 11/1991 Hakamata et al. ......... 250/216
5,523,573 A * 6/1996 Hanninen et al. ......... 250/459.1

OTHER PUBLICATIONS

David W. Piston et al., "Time-Resolved Fluorescence Imaging and Background Rejection by Two-Photon Excitation in Laser Scanning Microscopy", SPIE, vol. 1640, Time Resolved Laser Spectroscopy in Biochemistry III (1992), pp. 381-389.

David W. Piston et al., "Two-photon-excitation fluorescence imaging of three-dimensional calcium-ion activity". Applied Optics, vol. 33, No. 4, pp. 662-669. Feb. 1, 1994.

* cited by examiner

Primary Examiner—Joshua L Pritchett
(74) Attorney, Agent, or Firm—Darby & Darby

(57) ABSTRACT

A scanning microscope, having a detector, arranged in a detection beam path, for receiving detection light proceeding from a sample, has between the sample and the detector an optical shutter means with which the detection beam path can be blocked. A control means for controlling the shutter means is provided. The detection light beam path can be blocked automatically outside the scanning operation and in the event of an excessive detection light power level.

18 Claims, 3 Drawing Sheets

SCANNING MICROSCOPE

CROSS REFERENCE TO RELATED APPLICATIONS

This application claims priority to German patent application 102 53 609.0, the subject matter of which is hereby incorporated by reference herein.

FIELD OF THE INVENTION

The invention concerns a scanning microscope.

BACKGROUND OF THE INVENTION

In scanning microscopy, a sample is illuminated with a light beam in order to observe the detection light emitted, as reflected or fluorescent light, from the sample. The focus of an illuminating light beam is moved in a sample plane by means of a controllable beam deflection device, generally by tilting two mirrors, the deflection axes usually being perpendicular to one another so that one mirror deflects in the X direction and the other in the Y direction. Tilting of the mirrors is brought about, for example, by means of galvanometer positioning elements. The power level of the detection light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detected or fluorescent light. The illuminating light is coupled in via a beam splitter. The detection light coming from the specimen, which for example can be fluorescent or reflected light, travels back through the beam deflection device to the beam splitter, passes through it, and is then focused onto the detection pinhole behind which the detectors are located. This detection configuration is called a "descan" configuration. Detection light that does not derive directly from the focus region takes a different light path and does not pass through the detection pinhole, so that a point datum is obtained which results, by sequential scanning of the specimen with the focus of the illuminating light beam, in a three-dimensional image. A three-dimensional image is usually achieved by acquiring image data in layers.

In confocal scanning microscopy, a detection pinhole can be dispensed with in the case of two-photon (or multi-photon) excitation, since the excitation probability depends on the square of the photon density and thus on the square of the illuminating light intensity, which of course is much greater at the focus than in the adjacent regions. The fluorescent light being detected therefore very probably originates almost exclusively from the focus region, which renders superfluous any further differentiation, using a pinhole arrangement, between fluorescent photons from the focus region and fluorescent photons from the adjacent regions.

A non-descan configuration, in which the detection light does not travel to the detector via the beam deflection device (descan configuration) and the beam splitter which couples in the illuminating light, but rather is conveyed directly to a non-descan detector, is of interest especially in view of the already low fluorescent photon yield with two-photon excitation, since less light is generally lost along this detection light path. The non-descan detector can be arranged on the condenser side, i.e. on the side of the sample opposite from the objective. It is also possible to separate detection light proceeding from the sample out of the illuminating beam path using a dichroic beam splitter on the objective side, and convey it to a non-descan detector. Arrangements of this kind are known, for example, from the publication of David W. Piston et al., "Two-photon excitation fluorescence imaging of three-dimensional calcium-ion activity," Applied Optics, Vol. 33, No. 4, February 1996; and from Piston et al., "Time-Resolved Fluorescence Imaging and Background Rejection by Two-Photon Excitation in Laser Scanning Microscopy," SPIE Vol. 1640. Both of these publications are hereby incorporated by reference herein.

In known scanning microscopes, especially in the case of samples whose detection light has a very low power level, the theoretically possible image contrast is not achieved despite the most careful setup. This is attributable in particular to the fact that the detectors, especially the non-descan detectors used in a non-descan configuration, are continuously exposed to incident light, especially ambient light. This contributes to accelerated aging of the detectors and causes, in particular, undesired dark currents and background currents and poor noise behavior, and the detectors' sensitivity is reduced.

Premature aging or even instantaneous damage to or destruction of sensitive detectors is often caused by excessively high detection light power levels.

SUMMARY OF THE INVENTION

It is therefore an object of the present invention to provide a scanning microscope in which premature aging or destruction of the detectors is reduced.

The present invention provides a scanning microscope having a detector, arranged in a detection beam path, for receiving detection light proceeding from a sample and an optical shutter means between the sample and the detector with which the detection beam path can be blocked.

The invention has the advantage that the sensitive detectors, especially in a non-descan configuration, are reliably protected from damaging and destructive light, and the service life of the detectors is extended. Advantageously, the detection of weakly luminous samples with good image quality is enabled, even with older detectors. In the scanning microscope according to the present invention, particularly sensitive semiconductor detectors (such as avalanche photodiodes) are reliably protected from irradiation with excessive light power levels.

The shutter means can be arranged both between the sample and a non-descan detector, and between the sample and a descan detector.

A control means for controlling the shutter means is preferably provided. The control means can preferably automatically open up the detection beam path, by opening the shutter means, before the beginning of a scanning operation, and block it again at the end in order to protect the detectors. Provision is preferably made for the detection beam path to be automatically blockable when the light power level of the detection light exceeds a definable threshold. Provided for this purpose is a monitoring means that measures the light power level of the detection light and, in the event a destruction threshold is exceeded, transfers a signal to the control means or directly to the shutter means. The monitoring means contains a preferably destruction-resistant detector that is impinged upon by detection light split off from the detection light beam path. The split-off detection light is preferably spatially spread in order to avoid high power densities that might damage the monitoring means.

In a preferred embodiment, the control means extrapolates the future change over time in the detection light power level, and blocks the detected beam path with the shutter means if a detection light power level exceeding a threshold is expected.

In a preferred embodiment, provision is made for the detection beam path to be automatically blockable if the user manipulates the objective nosepiece or a beam splitter wheel, or performs another manipulation that influences the illumination beam path. This prevents scattered and reflected light, produced e.g. at the rotating objective nosepiece, from traveling to the detectors.

The shutter means is preferably embodied and activated in such a way that the detection beam path is blocked in the event of a failure of the control means or the scanning microscope's power supply. This embodiment is particularly safe.

The shutter means can contain a mechanical shutter or an electrooptical element or acoustooptical element or LCD element. Electrically controlled shutter means, for example acoustooptical tunable filters (AOTF) or acoustooptical modulators (AOM) or electrooptical modulators (EOM) or LCD elements, are particularly fast and therefore particularly effective for protection against excessive detection light power levels. The detector can also encompass a photodiode, in particular an avalanche photodiode, or a CCD element, in particular an EMCCD element, or a photomultiplier or photomultiplier array.

In a particular embodiment, the scanning microscope contains a multi-band detector that contains several detectors for different adjustable detection wavelength regions. In this embodiment, the shutter means can be arranged between the sample and the multi-band detector, or in front of each individual detector within the multi-band detector.

In a preferred embodiment, the scanning microscope is a confocal scanning microscope.

BRIEF DESCRIPTION OF THE DRAWINGS

The subject matter of the invention is depicted schematically in the drawings and will be described below with reference to the Figures, identically functioning elements being labeled with the same reference characters. In the drawings.

DETAILED DESCRIPTION OF THE INVENTION

Figure 1:
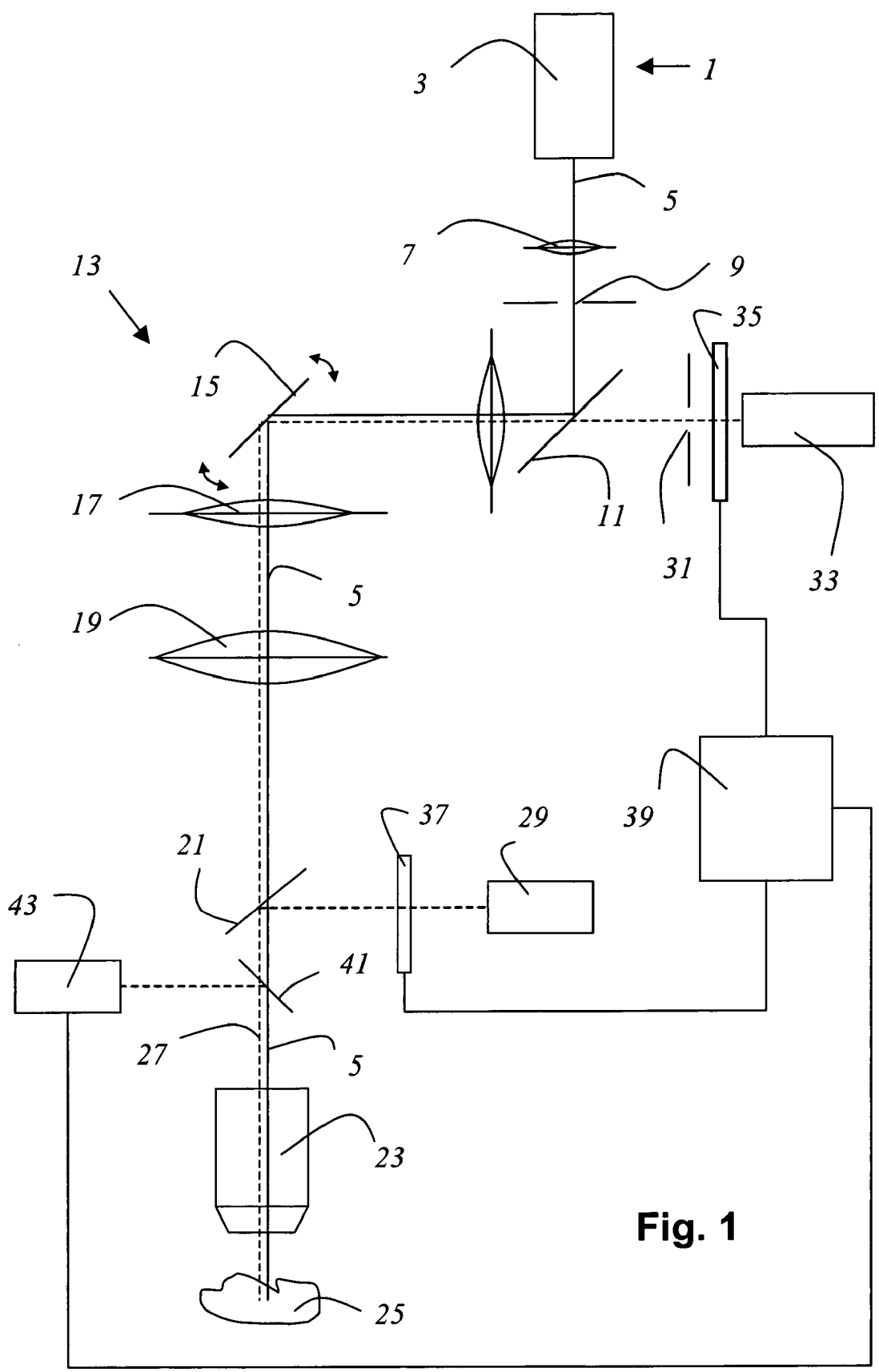
FIG. 1 shows a scanning microscope according to the present invention.

FIG. 1 schematically shows a scanning microscope according to the present invention. Illuminating light beam 5, coming from a light source 1 that is embodied as laser 3, is focused by optical system 7 onto excitation pinhole 9 and is then reflected by a main beam splitter 11 to beam deflection device 13, which contains a gimbal-mounted mirror 15. Beam deflection device 13 guides illuminating light beam 5, through scanning optical system 17, tube optical system 19, beam splitter 21, and objective 23, over or through sample 25. With non-descan detection, beam splitter 21 serves to couple out detection light 27 proceeding from the sample. Beam splitter 21 has a dichroic coating that allows illuminating light beam 5 to pass but reflects the wavelength-shifted detection light to non-descan detector 29. With descan detection, detection light 27 travels via beam deflection device 13 back to beam splitter 11, passes through it and detection pinhole 31, and then strikes descan detector 33. For descan detection, beam splitter 21 is preferably removed from the detection beam path. The coating can also be designed, however, in such a way that detection light 27 resulting, for example, from two-photon excitation is reflected to non-descan detector 29, and detection light from one-photon excitation passes unimpeded through beam splitter 21 and arrives at descan detector 33. A shutter means 37 is arranged in front of non-descan detector 29, and a further shutter means 35 in front of descan detector 33. Shutter means 37, 35 are embodied as acoustooptical filters (AOTF) which are controlled by a control means 39 that is embodied as an electronic circuit. The detection beam path is automatically opened up by the control means before the beginning of a scanning operation, and blocked at the end of the scanning operation. A small portion of detection light 27 is directed by a further beam splitter 41 to a monitoring means 43 that is embodied as a photodiode, which measures the light power level of the detection light and transmits it in the form of a measured signal to control means 39. The detection beam path is automatically blocked by control means 39 if the light power level of the detection light exceeds a defined threshold.

Figure 2:
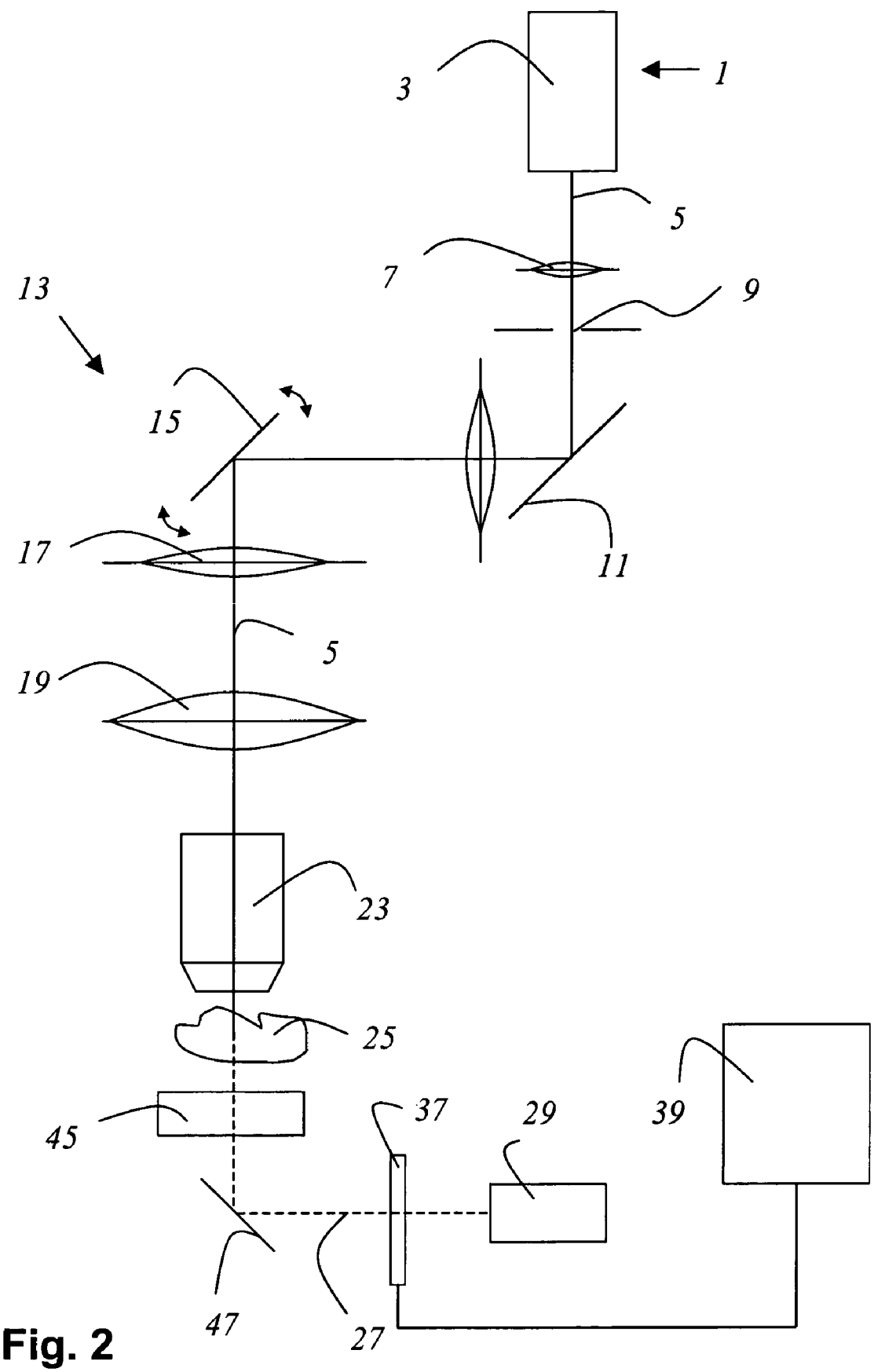
FIG. 2 shows another scanning microscope according to the present invention.

FIG. 2 shows a further scanning microscope according to the present invention, which is similar to the scanning microscope shown in FIG. 1 but with non-descan detection on the transmitted-light side. Detection light 27 is concentrated by a condenser 45 into a detection light beam, and directed by a mirror 47 to non-descan detector 29, in front of which is arranged a shutter means 37 that is embodied as a barrier operated by a magnet. Shutter means 37 is automatically controlled by a control means 39.

Figure 3:
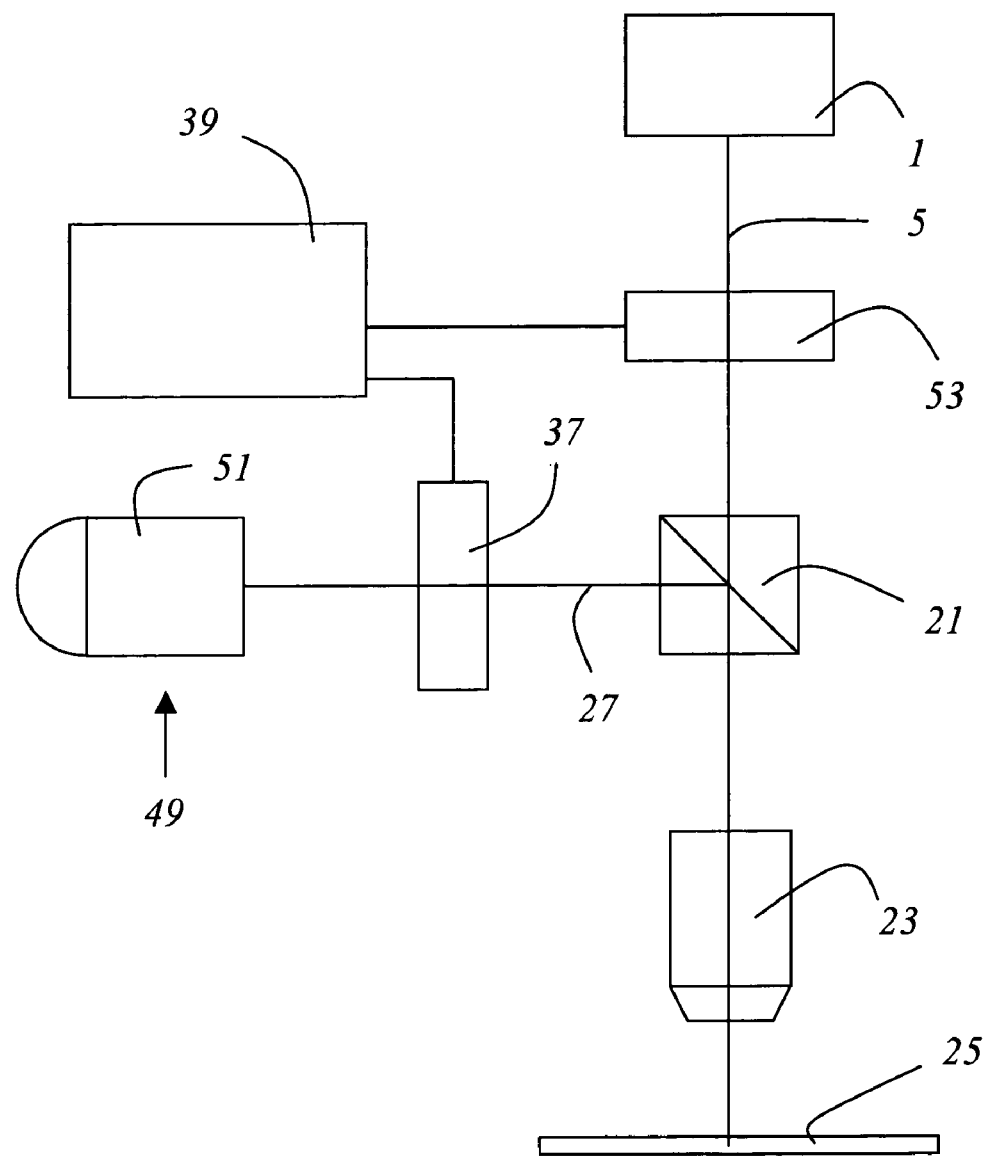
FIG. 3 shows a further scanning microscope according to the present invention.

FIG. 3 schematically shows a further scanning microscope according to the present invention. Illuminating light beam 5 emitted by light source 1 illuminates sample 25 through beam splitter 21 and objective 23. Detection light 27 proceeding from sample 25 is directed by beam splitter 21 to detector 49, which is embodied as avalanche photodiode 51. A shutter means 37, which is automatically controlled by a control means 39, is positioned in front of detector 49. Shutter means 37 blocks the detection beam path before the detection light power level reaches a destruction threshold, and when images are not being acquired. For safety, a further shutter means 53 that is also operated by control means 39 is provided in the beam path of illuminating light beam 5.

The invention has been described with reference to a particular exemplary embodiment. It is self-evident, however, that changes and modifications can be made without thereby leaving the range of protection of the claims below.

What is claimed is:

1. A scanning microscope having a detector, arranged in a detection beam path, for receiving detection light proceeding from a sample, a monitoring means that measures the light power level of the detection light, and an optical shutter means between the sample and the detector with which the detection beam path can be blocked based on the light power level of the detection light exceeding a definable threshold.

2. The scanning microscope as defined in claim 1, wherein the detector is a non-descan detector.

3. The scanning microscope as defined in claim 1, wherein the detector is a descan detector.

4. The scanning microscope as defined in claim 1, further comprising a control means for controlling the shutter means.

5. The scanning microscope as defined in claim 4, wherein the control means extrapolates the future change over time in the detection light power level, and wherein the detection beam path is automatically blockable when the light power level of the detection light is expected to exceed a definable threshold.

6. The scanning microscope as defined in claim 1, wherein the detection beam path can be automatically opened up before the beginning of a scanning operation, and blocked at the end of the scanning operation.

7. The scanning microscope as defined in claim 1, wherein the shutter means contains a mechanical shutter or an electrooptical element or acoustooptical element or LCD element.

8. The scanning microscope as defined in claim 1, wherein the detector contains a photodiode, in particular an avalanche photodiode, or a CCD element, in particular an EMCCD element, or a photomultiplier or photomultiplier array.

9. The scanning microscope as defined in claim 1, wherein the scanning microscope is a confocal scanning microscope.

10. A method for scanning a sample, comprising:
  providing a microscope having a detector disposed in a detection beam path and configured to receive detection light proceeding from the sample;
  measuring the light power level of the detection light using a monitoring means; and
  blocking the detection beam path, when the light power level of the detection light exceeds a definable threshold, using an optical shutter means disposed between the sample and the detector.

11. The method as defined in claim 10, wherein the detector is a non-descan detector.

12. The method as defined in claim 10, wherein the detector is a descan detector.

13. The method as defined in claim 10, further comprising controlling the shutter means using a control means.

14. The method as defined in claim 10, further comprising automatically opening the detection beam path before the beginning of a scanning operation, and blocking the detection beam path at the end of the scanning operation.

15. The method as defined in claim 13, further comprising extrapolating the future change over time in the detection light power level using the control means.

16. The method as defined in claim 10, wherein the shutter means contains a mechanical shutter or an electrooptical element or acoustooptical element or LCD element.

17. The method as defined in claim 10, wherein the detector contains a photodiode, in particular an avalanche photodiode, or a CCD element, in particular an EMCCD element, or a photomultiplier or photomultiplier array.

18. The method as defined in claim 10, wherein the scanning microscope is a confocal scanning microscope.

* * * * *